United States Patent [19]

Scholle

[11] 4,137,930

[45] Feb. 6, 1979

[54] SINGLE OPERATION NORMALLY CLOSED COUPLING VALVE

[75] Inventor: William R. Scholle, Corona del Mar, Calif.

[73] Assignee: Scholle Corporation, Northlake, Ill.

[21] Appl. No.: 762,757

[22] Filed: Jan. 26, 1977

[51] Int. Cl.² .............................................. F16L 29/00
[52] U.S. Cl. .............................. 137/68 R; 137/614.03;
137/614.04; 222/83; 285/4
[58] Field of Search ........... 137/68 R, 614.03, 614.04;
222/5, 83, 83.5; 285/3, 4

[56] References Cited

U.S. PATENT DOCUMENTS

| 2,553,267 | 5/1951 | Nedoh | 137/68 R UX |
|---|---|---|---|
| 2,717,720 | 9/1955 | Nissen | 222/83.5 X |
| 3,182,858 | 5/1965 | Beaudoin | 222/83 |
| 3,201,148 | 8/1965 | Shurtleff | 285/3 |
| 3,202,442 | 8/1965 | Abbey et al. | 285/3 |
| 3,391,951 | 7/1968 | Miller | 137/68 R X |
| 3,844,585 | 10/1974 | Sands et al. | 285/3 |
| 3,930,286 | 1/1976 | McGowen | 222/83 |
| 3,968,872 | 7/1976 | Cavazza | 222/83 X |
| 3,986,508 | 10/1976 | Barrington | 222/83 X |
| 4,004,586 | 1/1977 | Christensen et al. | 222/83 X |

Primary Examiner—Gerald A. Michalsky
Attorney, Agent, or Firm—Gary, Juettner & Pyle

[57] ABSTRACT

A normally closed valve is characterized by an integral valve body forming a fluid passage between an inlet thereto and an outlet therefrom, and a flow barrier within the passage integrally joined with the body to hermetically seal the passage. The barrier is movable or rupturable by a fluid coupler, inserted into the outlet end of the passage, to open the passage between the inlet thereto and the coupler.

Preferably, the valve is economically formed of a plastic material, such as polyethylene, and connects at its outlet with a fluid coupler having a normally closed, movable seal at its inlet. In the use of the valve, upon movement of the inlet end of the coupler into the outlet end of the passage, the valve passage forms a fluid seal therewith prior to engagement of the barrier thereby. Continued movement of the coupler into the valve then moves the flow barrier to open the passage, and engages the coupler seal with a plunger to move the seal from a seat at the inlet to the coupler to establish the fluid passage between the inlet to the valve passage and the inlet to the coupler. In consequence of forming a seal between the valve and coupler prior to opening of either the flow barrier or the coupler seal, a connection may be established between the coupler and the valve in a drip-free manner, and the fluid to be valved is at all times maintained out of contact with the atmosphere and in a sanitary condition.

24 Claims, 4 Drawing Figures

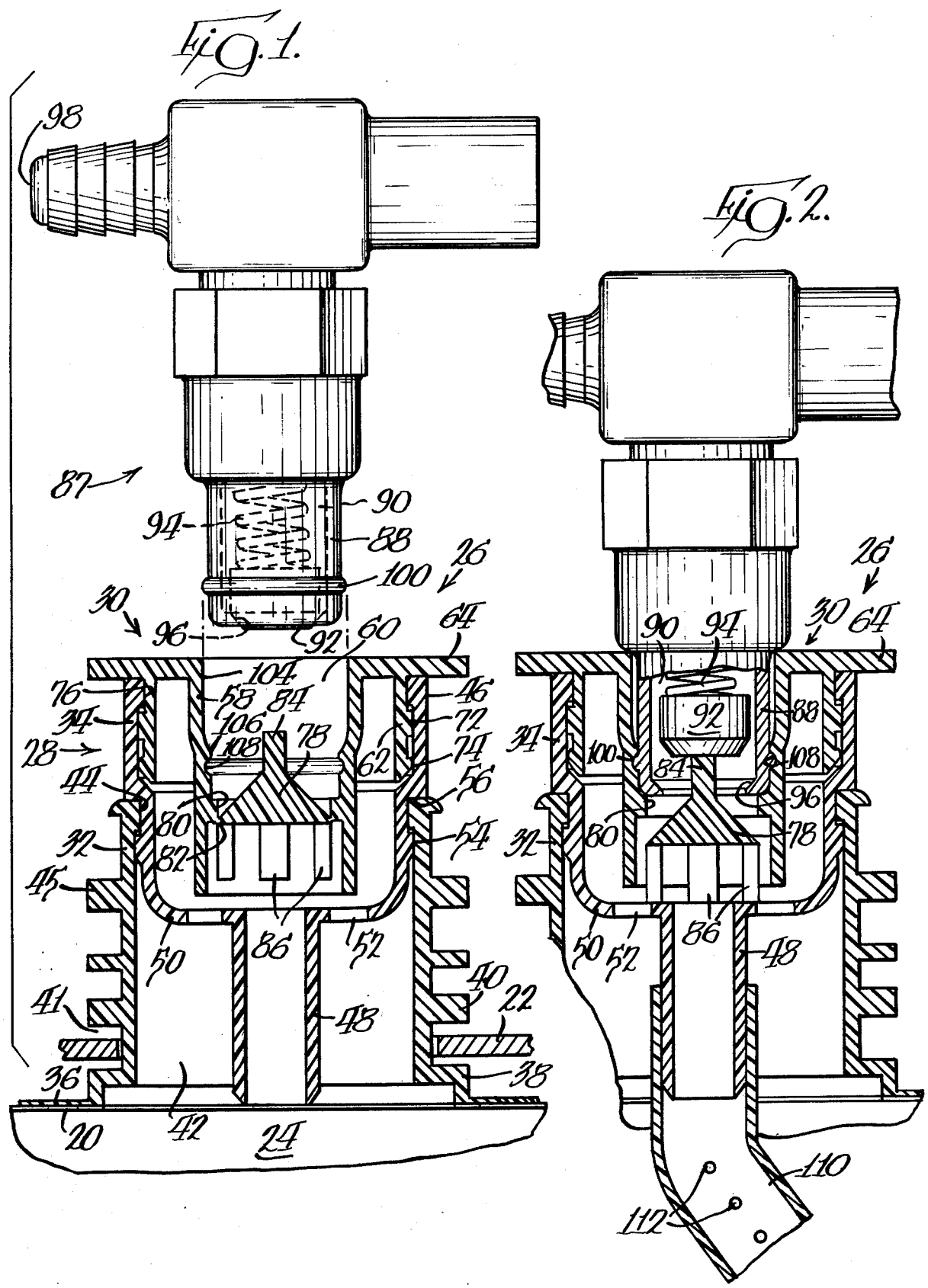

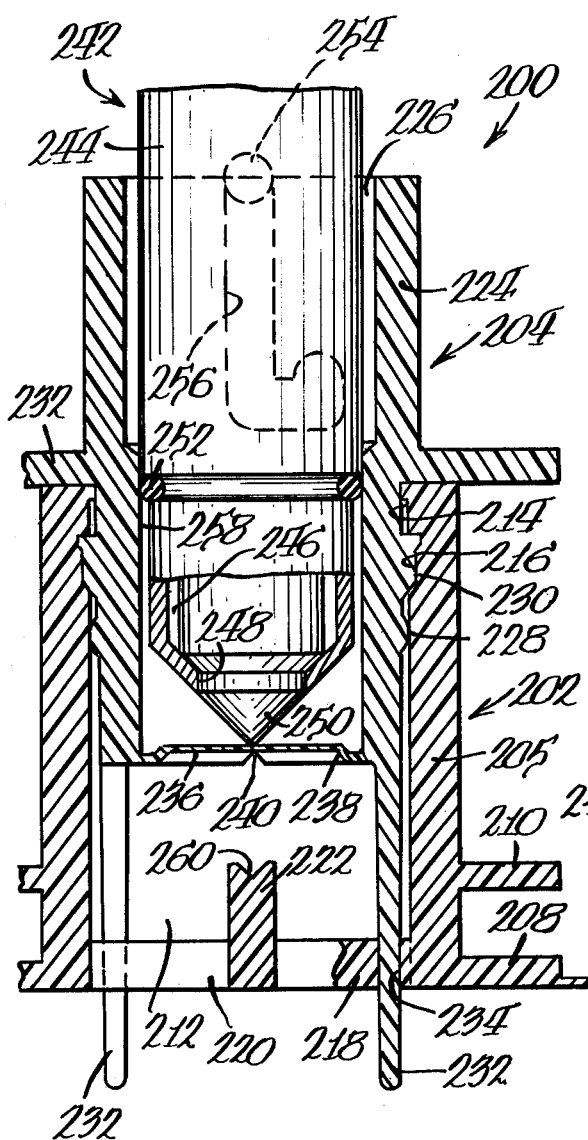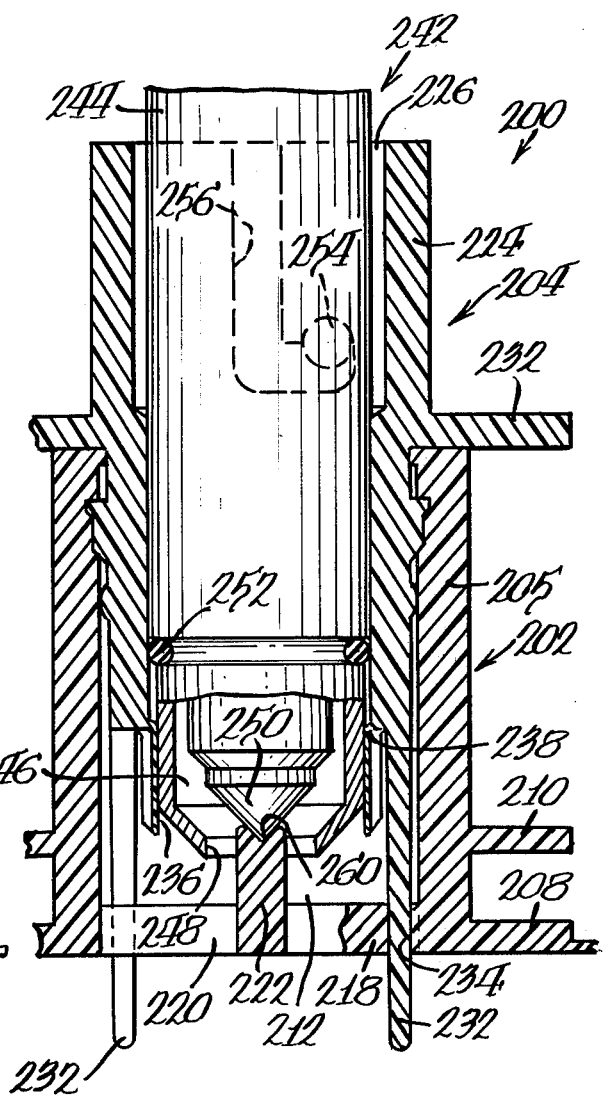

SINGLE OPERATION NORMALLY CLOSED COUPLING VALVE

BACKGROUND OF THE INVENTION

The present invention relates to single operation normally closed valves, and in particular to a normally closed, hermetically sealed valve for interconnecting with and being opened by a fluid couple, while maintaining at all times a fluid tight connection therewith.

Many fluids customarily are transported and stored within sealed containers equipped with valves through which the fluid may later be selectively withdrawn. Where the containers are reusable and of relatively expensive metal, and where the fluid is perishable when exposed to contaminants, such as bacteria or spores in the atmosphere, great care must be exercised to ensure cleanliness of the containers and to at all times maintain the fluid in a sanitary condition.

One such perishable fluid is syrup for drinkable beverages, which bottling companies conventionally distribute to their dealers in reusable stainless steel containers equipped with spring loaded valves. To withdraw the syrup, a dealer inserts a so-called Hansen-style coupler or connector into the valve to establish a fluid passage with the contents of the container. The Hansen coupler is generally cylindrical, with a spring loaded seal at an inlet end thereto, and upon movement of the coupler into the valve the seal engages a complementary spring loaded seal in the valve. Continued movement of the coupler into the valve both moves the valve seal thereof away from its seat, against the action of the spring, and moves the coupler seal away from its seat, to establish a fluid passage between the syrup in the container and an outlet from the coupler. Means are provided, when the coupler is fully extended into the valve, to removably secure the coupler therewith and to form a fluid seal therebetween.

Because of the cost and replacement difficulty of the stainless steel containers, dealers are required to make a substantial deposit on each container. Further, because of the perishable nature of the syrup, empty stainless steel containers must thoroughly be cleaned and sterilized, at considerable expense, prior to being refilled with syrup, and care must at all times be taken, including when the coupler is interconnected with the valve, to maintain the syrup in a sanitary condition. It would therefore be very desirable to provide such syrup to dealers in inexpensive, single use, sanitary containers, of a type wherein a plastic bag for holding the fluid is contained within a paperboard closure, equipped with a valve which maintains the fluid in a hermetically sealed sterile condition prior to dispensing, and which economically may be discarded when the contents thereof are exhausted.

OBJECTS OF THE INVENTION

Accordingly, an object of the present invention is to provide a valve, of economical construction, which places a hermetically sealed yet openable barrier in a flow passage therethrough.

Another object of the invention to provide such a valve for use with a sanitary plastic bag for containing a fluid within a cardboard box, which maintains the fluid in a hermetically sealed, sanitary condition.

A further object of the invention to provide such a valve, for use with a plastic bag, which is connectable with a coupler to immediately form a sanitary fluid seal therewith, and to then be opened by the coupler to establish a sanitary conduit for a flow of fluid from the bag to an inlet to the coupler.

Yet another object of the invention to provide a normally closed valve in combination with a plastic bag for fluids, both of such economical construction as to permit disposal thereof when the contents of the bag are exhausted.

SUMMARY OF THE INVENTION

In accordance with the present invention, a normally closed fluid valve of economical construction has an integral housing forming a fluid passage between an inlet thereto and an outlet therefrom, and a flow barrier within the passage, joined with the remainder of the housing, forming a hermetic seal within the passage. The barrier is movable and rupturable by a fluid coupler, extended into the outlet end of the passage, to establish a fluid conduit between the inlet to the passage and the coupler. The valve passage forms a hermetic fluid seal with the coupler prior to movement of the barrier to open the valve. This allows a connection to be established between the valve and the coupler in a drip-free, sanitary manner, irrespective of whether the outlet from the valve extends upward or downward.

Preferably, the valve is for communicating at the passage inlet with contents in a bag of flexible thermoplastic material, and for interconnecting with and being opened by a tubular coupler having a seal at a fluid inlet end thereof, the coupler seal normally being urged against a seat to close a passage through the coupler, and being movable from the seat to open the passage. The valve housing is of thermoplastic material, and has a tubular body portion forming the passage. In one embodiment of the invention, a flow barrier is interposed in the passage and is integrally, sealingly and frangibly connected with the passage by a frangible web, whereby the valve passage inlet is hermetically sealed from the outlet. The barrier is engageable by the seal of the coupler, upon movement thereof into the outlet from the passage, to break or rupture the frangible web and to move the barrier to a passage open position whereat means are provided for blocking further movement of the barrier, so that upon continued movement of the coupler into the valve passage the barrier moves the coupler seal from its seat to establish the conduit through the valve and coupler.

In another embodiment of the invention, the flow barrier is sealingly joined with the passage by an integral hinge portion to hermetically seal the valve passage inlet from the outlet, and at least one score line is formed across the surface of the barrier toward the valve passage inlet. Engagement of the barrier with the coupler seal then breaks or ruptures the barrier along the at least one score line to open the passage. Continued movement of the coupler then folds the barrier, about the hinges, against the passage walls, and engages the coupler seal with a plunger to move the seal from its seat to establish the passage through the valve and coupler.

Other objects, advantages and features of the invention will become apparent from a consideration of the following detailed description, when taken in conjunction with the accompanying drawings.

BRIEF DESCRIPTION OF THE DRAWING

FIG. 1 is an elevation view, partly in cross-section, illustrating a hermetically sealed valve in accordance with one embodiment of the present invention, and a normally sealed coupler positioned to be interconnected therewith;

FIG. 2 is an elevation view, partly in cross-section, showing the valve of FIG. 1 fully interconnected with the coupler to both open the hermetic seal thereof and the normally closed seal of the coupler;

FIG. 3 is an elevation view, partly in cross-section, illustrating a hermetically sealed valve in accordance with another embodiment of the invention, and a normally sealed coupler extended partially therein, and FIG. 4 is an elevation view, partly in cross-section showing the valve of FIG. 3 fully interconnected with the coupler to both open the hermetic seal thereof and the normally closed seal of the coupler.

DETAILED DESCRIPTION

Referring to FIG. 1 of the drawings, a sterile and flexible fluid supply container or bag 20 of thermoplastic material, such as polyethylene, is disposed within a paperboard container 22 and is filled with liquid contents, indicated generally at 24.

A valve means in accordance with one embodiment of the invention, indicated generally at 26, extends through an aperture in the paperboard container, and is of a molded plastic material, such as flexible polyethylene, polypropylene and the like. The valve means includes a pair of elements, generally indicated as a sleeve member 28 and a valve member 30 received within the sleeve member.

The sleeve 28 is comprised of an outer, integral, tubular spout member 32, and an inner, integral, tubular member 34 sealingly extended into and engaged with the outer member. While the sleeve is illustrated as comprising the two individual members 32 and 34, the sleeve could just as readily be of unitary structure.

The outer member 32 has an integral, annular, external flange 36 at an inner end thereof, which is secured as by heat sealing to the flexible bag 20 about an aperture therein to provide communication for the contents 24 of the bag from the bag to and through the valve means 26. The flange 36 extends from an annular shoulder 38 formed at the inner end of the member 32 which, together with an annular, external rib or flange 40, forms an annular recess 41 for receiving therewithin edges of the paperboard container 22 surrounding the opening therein. This secures the valve means 26 in a dispensing position exterior of the container. A passage 42 extends through the outer member 32 and terminates in an inwardly extending annular shoulder 44 toward an outer end thereof. One or more additional external annular flanges 45 may be provided to aid in supporting the member 32 in position for initially filling the bag therethrough.

The outer member 32 may be of standard design, whereby the inner member 34 serves as an adapter to interconnect the valve 30 therewith. The adapter is funnel-shaped, and has a relatively large diameter upper tubular portion 46 and a relatively small diameter lower tubular extension 48 coaxially joined therewith by a wall section 50, having a plurality of fluid passages 52 formed therethrough, extending between the upper and lower portions 46 and 48. The upper portion 46 has a radially outward extending seal 54, whereby upon movement of the adapter into the passage 42 the seal cams over the shoulder 44 and moves into sealed engagement with the surface of the passage 42 to form a secure and hermetic fluid seal between the adapter and the tubular member 32. An external, annular shoulder 56 of the adapter engages the outermost end of the member 32 to limit entry of the adapter therewithin, and engagement of the seal 54 with the shoulder 44 then inhibits outward movement of the adapter from the member 34.

The valve 30 includes an inner tubular member 58 forming a fluid passage 60 therethrough, and an outer cylindrical portion 62 coaxially joined therewith by an annular rib 64. The outer portion has a pair of annular fluid seals 72 and 74 extending radially outward therefrom, and upon movement of the valve into the adapter the seals cam over an inner annular shoulder 76 at the outer end of the adapter and move into sealed engagement with the inner surface of the upper portion 46 thereof to form a secure and sanitary fluid seal between the valve 30 and the adapter 34. The rib 64 engages the outermost end of the adapter to limit entry of the valve therewithin, and outward movement of the valve from the adapter is then inhibited by engagement of the seal 72 with the shoulder 76.

The passage 60 through the valve 30 is normally closed and hermetically sealed between its inlet and its outlet by a flow barrier, cap or conical breakaway seal 78 formed integrally with the tubular portion 58 at a passage closed position. The seal is breakingly secured around the outer edge of its base to a lower edge of an inner, annular shoulder 80, formed with the portion 58, by a relatively thin, frangible web 82 to form an effective, hermetic and absolute barrier to a flow of fluid through the valve. A cylindrical plunger 84 extends from the apex of the seal toward an outlet from the valve, and a plurality of legs 86 extend from the base toward an inlet to the valve.

With the molded plastic valve 30, adapter 34 and spout 32 assembled to form the valve means 26, an economical, effective and sanitary seal is formed between the contents 24 of the bag 20 and the atmosphere, irrespective of whether the bag is in an upright or inverted position. The fluid flow barrier 78 absolutely blocks the passage through the valve, and will absolutely prevent a flow of fluid therethrough until the barrier is moved. In other words, the barrier does not have the leakage potential of most conventional valves where a seal is positioned against a valve seat, and thereby ensures that the contents in the bag will remain in a sanitary condition. By virtue of the frangible web 82 connecting the barrier with the valve body, the valve may conveniently be opened by applying to the barrier a force sufficient to rupture or break the barrier from the frangible portion. If desired, the valve may be equipped with a removable or tear off cap (not shown) to maintain the interior thereof in a cleanly condition prior to the valve being opened.

While the valve, adapter and spout have been illustrated as three separate units, it is understood that two of the units (i.e., the spout and the adapter, or the adapter and the valve) could for greater economy be fabricated as a single unit for interconnecting with the remaining unit, or that all three units could be formed as a single structure. In such a case, the overall construction would, of course, be greatly simplified. However, in a preferred practice of the invention the valve means is formed of at least two separate units with the spout separately attached to the bag, whereby the bag may conveniently be filled with contents through the spout.

The valve means is adapted to interconnect with a coupler or connector, indicated generally at 87, and to be opened thereby during interconnection. The coupler may be a so-called Hansen style connector, which includes a tubular section 88 defining a fluid passage 90 therethrough. A seal 92 is normally urged by a spring 94 against a valve seat 96 at an inlet to the passage to close the passage, and is movable from the seat against the urging of the spring to open the passage for a flow of fluid between the inlet thereto and an outlet 98 therefrom. The section 88 is formed with an external, circumferential lip or annular seal 100 toward the inlet end thereof.

Referring also to FIG. 2, to connect the coupler 87 with the valve means 26 to withdraw contents of the bag, the coupler is extended, seal 92 first, into the outlet end of the passage 60 through the valve 30. As the coupler enters and continues to be moved into the valve passage: (a) an inner wall area 104 of the passage engages the annular seal 100 and immediately forms a secure and sanitary fluid seal between the coupler and the valve; (b) the plunger 84 then engages the seal 92, and the strength of the frangible web 82 is ultimately overcome by the force of the seal 92, whereupon the web breaks to open the valve and the barrier 78 is moved from the passage closed position to a passage open position toward the valve inlet, whereat the legs 86 thereof engage the wall 50; (c) the seal 92 of the coupler is moved from its seat 96 by the plunger 84 as further movement of the barrier is blocked by the wall 50, and (d) the annular seal 100 of the coupler rides over an inwardly extending annular lip 106 and enters an annular detent 108 in the valve to form a secure and sanitary fluid seal with the valve, and to detachably secure the coupler within the valve with the plunger 84 holding the coupler seal 92 from its seat to establish a common conduit through the valve and coupler.

To ensure withdrawal of all of the contents from the bag 20, irrespective of the physical position of the container 22, a length of tubing 110, having a plurality of apertures 112 formed therethrough, may be positioned around the tubular extension 48 to extend into the bag. As the contents are then pumped or otherwise withdrawn from the bag, the bag collapses around the tubing so that the tubing constantly communicates with the contents until the same are completely exhausted.

Referring now to FIG. 3, there is provided in accordance with another embodiment of the invention a valve means, indicated generally at 200. The valve means is economically formed of a molded plastic material, and includes a pair of elements, indicated generally as an outer sleeve or spout member 202 and a valve member 204 sealingly disposed within the sleeve member.

The sleeve member 202 is integrally formed and includes a tubular body portion 205 having an annular, external flange 206 at an inner end thereof. The flange is adapted to be secured as by heat sealing to a flexible plastic bag, within a paperboard container, about an aperture in the bag to provide communication for contents of the bag to and through the valve means 200, neither the bag nor the container being shown. The flange extends from an external, annular shoulder 208 which, together with an external, annular flange or rib 210, forms an annular recess for receiving edges of the paperboard container, surrounding an opening formed therein adjacent the aperture in the bag, to secure the valve means in dispensing position exterior of the container. A passage 212 extends through the sleeve member and terminates at an outer end thereof in an inner, annular, stepped shoulder 214. A stepped, annular detent or recess 216 is formed in the wall of the passage adjacent the shoulder 214, and a wall 218, having a plurality of openings 220 formed therethrough and a plunger 222 extending upward therefrom, crosses the passage at an inlet end thereto, the passage and the wall openings together providing a fluid conduit through the sleeve member.

The valve member 204 is integrally formed, and includes a tubular body portion 224 forming a fluid passage 226 therethrough. The body portion has a pair of annular fluid seals 228 and 230 extending radially outward therefrom, the seal 230 being complementary in shape to the detent or recess 216, and a radially outward extending shoulder or rib 232. The valve is adapted to be entered into and sealingly received within the sleeve, and upon entry of the valve therein the seals 228 and 230 cam over the stepped shoulder 214 and move into sealed engagement with the walls of the passage 212 to form a sanitary fluid seal between the valve and the sleeve, the seal 230 entering the detent 216 both to form a seal therewith and to secure the valve against sliding movement within the sleeve. The rib 232 engages the outermost end of the body portion 205 of the sleeve to limit entry of the valve therein, and outward movement of the valve from the sleeve is then inhibited by engagement of the seal 230 with the wall areas of the detent 216. At least two tines or legs 232 extend from the lower end of the tubular body 224 through associated passages 234 in the wall 218 to prevent the bag from closing the valve upon collapse of the bag as contents are drawn therefrom.

The passage 226 through the valve 204 is normally closed and hermetically sealed between its inlet and its outlet by a flow barrier, cap or breakable seal 236 formed integrally with the tubular portion 224 at the inlet to the passage. The seal is secured around its outer periphery to the tubular portion by an integral hinge 238 to form an effective, hermetic and absolute barrier to a flow of fluid through the valve. At least one score line or pair of peripheral notches 240 are formed in the seal to facilitate breaking of the seal to open the valve, as will be described.

The molded plastic valve 204 and sleeve 202, as assembled, form an economical and sanitary fluid seal between contents of a bag and the atmosphere, irrespective of whether the bag is in an upright or inverted position. The flow barrier or seal 236 absolutely blocks the passage through the valve, and does not have the leakage potential or cost of conventional valves where a seal is positioned against a valve seat. Because the barrier is integrally hinged with the valve body and notched, the valve may conveniently be opened by applying to the barrier a force sufficient to break the barrier along the notched portions and to then fold the barrier about the hinge.

The valve means is adapted to interconnect with a coupler or connector, indicated generally at 242, and to be opened thereby during interconnection. The connector includes a tubular section 244 defining a fluid passage 246 therethrough, and a valve seat 248 at an inlet end to the passage. A conical seal 250 is normally urged against the valve seat by a spring (not shown) to close the passage through the coupler, and is movable from the seat against the urging of the spring to open the passage for a flow of fluid through the coupler. An O-ring 252 is positioned around the section 244 to form a seal with the wall of the valve passage 226, and a bayonet pin 254 extends radially outward from the section for entering a "J" slot 256 formed in the body portion 224 of the valve.

To connect the coupler with the valve means 204, the coupler is extended, seal 250 first, into the outlet end of the passage through the valve 204, with the bayonet pin entering the "J" slot. Referring also to FIG. 4, as the coupler enters and continues to be moved into the valve passage: (a) the coupler seal 252 engages a wall area 258 of an inner, narrowed portion of the passage 226, and immediately forms a secure and sanitary fluid seal between the coupler and the valve; (b) the apex of the coupler seal 250 engages the flow barrier 236 and breaks the flow barrier along the notched or slotted portions thereof, whereupon the flow barrier opens and is folded downward about the integral hinge 238 to open the valve; (c) the seal 250 engages the plunger 222 within a recessed upper portion 260 thereof, and is moved from its seat 248 to open the passage through the coupler, and (d) the bayonet pin is entered into the lower leg of the "J" slot, by rotating the coupler, to detachably secure the coupler within the valve means with the coupler seal 250 being held from its seat to establish a common conduit through the valve and coupler.

The invention thus provides economical, normally closed, hermetically sealed valves adapted to be interconnected with and opened by couplers, while at all times maintaining secure and drip-free fluid seals therewith. In consequence of a sanitary fluid seal being formed prior to opening of either the valve or the coupler, the contents of the bag are at all times maintained in a sealed and sanitary condition, and a dripless connection may be established between the coupler and the valve irrespective of whether the valve is in an upright or an inverted position. When the contents of the bag are exhausted, the coupler is disengaged from the valve, and the valve means, bag and container are economically discarded.

While embodiments of the invention have been described in detail, it is understood that various modifications and other embodiments thereof may be devised by one skilled in the art without departing from the spirit and the scope of the invention, as defined by the appended claims.

What is claimed is:

1. In a hermetically sealed fluid valve for interconnecting with and being opened by a coupler therefor upon movement of said coupler into an outlet from said valve, said coupler being of a type having a tubular body with a passage therethrough and a passage seal normally closing the passage therein, said passage seal being movable into said coupler passage to open said passage, a valve body having an inlet and an outlet and a passage between said inlet and said outlet, and a breakable flow barrier interposed in said passage spaced from said outlet and hermetically sealing said inlet from said outlet, said coupler body and passage seal being movable into said valve body passage through said outlet and said flow barrier being engageable by said coupler passage seal, upon movement of said coupler into said outlet, with a force sufficient to break said barrier to remove said hermetic seal between said passage inlet and outlet to open said valve, said valve passage being of a size to accommodate movement of said coupler body and passage seal therein while forming a fluid seal between said coupler body and the surface of said valve passage, said barrier being spaced from said outlet a distance sufficient to form said fluid seal prior to engagement of said barrier with said coupler passage seal, said valve including means for releasably latching with said coupler after engagement of said barrier by said coupler and means in said valve body passage for moving said coupler passage seal into said coupler passage after the breaking of said barrier and when said valve and coupler are releasably latched, whereby said valve passage forms a common conduit with said coupler passage.

2. In a valve as set forth in claim 1, said barrier being conical and frangibly connected around the outer periphery of its base with said valve body within said passage with said base toward said passage inlet, said means for moving said passage seal including a cylindrical projection extending from said barrier toward said passage outlet for engaging said coupler seal to cause said frangible connection to break and to move said passage seal into said coupler passage.

3. In a valve as set forth in claim 1, said barrier being generally planar and integrally and sealingly hinged with said valve body within said passage, said barrier upon engagement by said coupler passage seal being breakable and foldable about said integral hinge to open said valve passage, said means for moving said passage seal including means connected with said valve body to the side of said barrier toward said valve passage inlet for engaging said coupler passage seal after the breaking of said barrier to move said passage seal into said coupler passage with movement of said coupler into said valve.

4. In combination, a bag of flexible thermoplastic material, a hermetically sealed valve on the bag communicating at an inlet thereto with the contents in the bag, and a tubular coupler for connecting with and opening said valve upon movement of said coupler into an outlet from said valve, said coupler being of a type including a tubular body portion having a passage therethrough and a passage seal within said passage at an inlet thereto, said passage seal normally being urged against a seat to close said coupler passage inlet, and being movable from said seat into said passage to open said coupler passage; said valve including a body of thermoplastic material having an inlet and an outlet and a passage formed therethrough between said inlet and outlet, and a breakable flow barrier interposed in said passage spaced from said inlet and said outlet and hermetically sealing said inlet from said outlet, said barrier being engageable with said seal of said coupler, upon movement of said coupler into said valve outlet, with a force sufficient to break said barrier to remove said hermetic seal between said valve passage inlet and outlet, means connected with said valve body within said valve passage for moving said coupler passage seal from its seat with continued movement of said coupler into said valve passage after the breaking of said barrier thereby to open said coupler passage to establish a common conduit with said valve passage, at least one of said valve body and said coupler having means thereon forming an annular fluid seal between said coupler body and the surface of said valve passage in response to movement of said coupler into said outlet and prior to engagement of said barrier with said coupler seal, whereby a drip free connection is formed between said coupler and said valve prior to opening of said valve.

5. In a hermetically sealed valve as set forth in claim 4, said flow barrier in said passage being sealingly connected with said valve body by a frangible web to hermetically seal said valve passage inlet from said outlet, said barrier being engageable by said coupler with said force sufficient to break said frangible web to remove said hermetic seal and to open said valve.

6. In a hermetically sealed valve as set forth in claim 5, said flow barrier being a conically shaped seal with an apex thereof toward said valve passage outlet and integrally joined around the outer periphery of a base thereof with said body by said frangible web with said base toward said outlet, said frangible portion being thinner than said conical seal to ensure breaking thereat upon engagement of said conical seal with said coupler seal.

7. In a valve as set forth in claim 6, said conical seal having an integral plunger extending from the apex thereof toward said outlet for engaging said coupler passage seal upon movement of said coupler into said valve outlet and for moving and holding said coupler seal away from said seat when said coupler is fully extended into said valve.

8. In a valve as set forth in claim 7, said conical seal having a plurality of legs extending from the base thereof toward said valve inlet, means connected with said valve body including a barrier extending inwardly of said valve passage at a position toward said inlet thereto for engaging the ends of said legs after said conical seal is broken from said frangible web to arrest movement of said barrier, whereby continued movement of said coupler into said valve passage causes said plunger to move said coupler passage seal from said seat, said valve passage extending around said barrier.

9. In a valve as set forth in claim 4, said valve body having an external annular flange around said inlet thereto which is hermetically sealed to said flexible bar around an opening therein to provide communication between said valve inlet and the contents in said bag.

10. In a hermetically sealed valve as set forth in claim 4, said flow barrier in said passage being sealingly and integrally hinged with said valve body to hermetically seal said valve passage inlet from said outlet, said barrier upon engagement by said coupler with said force sufficient being breakable and foldable about said integral hinge to remove said hermetic seal and open said valve.

11. In a hermetically sealed valve as set forth in claim 10, said flow barrier being generally planar and scored along a surface thereof toward said valve passage inlet to facilitate breaking thereof by said coupler.

12. In a hermetically sealed valve as set forth in claim 1, said means connected with said valve body having a plunger in said passage at a position toward said inlet thereto, said barrier being foldable about said hinge and around said coupler upon being broken, said plunger engaging said passage seal and moving said seal from said seat upon said coupler being fully extended into said valve, whereby said coupler and valve form a common fluid conduit.

13. In a hermetically sealed valve as set forth in claim 4, said valve body including means for releasably latching with said coupler when said coupler is fully extended into said valve.

14. In a combination of a fluid valve and coupler therefor, said valve comprising a valve body having an inlet and an outlet and a passage therethrough between said inlet and said outlet and a breakable flow barrier in said passage spaced from said outlet and hermetically sealing said inlet from said outlet, said coupler comprising a coupler body having an inlet end and a channel therethrough and a channel seal normally closing the inlet end of said channel, said seal being movable into said channel to open said channel, said coupler body and channel seal being movable into said valve passage outlet to engage and break said flow barrier with said channel seal to open said passage, and means connected with said valve body within said passage to the side of said barrier toward said passage inlet for moving said channel seal into said channel after the breaking of said barrier to establish a fluid conduit between said passage and said channel.

15. In a combination as in claim 14, said coupler body and valve passage being tubular, at least one of said bodies having means for forming an annular seal therebetween in response to movement of said coupler body into said valve passage, said flow barrier being spaced from said passage outlet a distance sufficient to form said seal prior to engagement of said barrier by said coupler.

16. In a combination as in claim 14, said valve and coupler bodies including means for releasably connecting said coupler and valve.

17. In a combination as in claim 16, said coupler body being tubular and having an external annular seal for entering said valve passage and forming a fluid seal therewith, said valve body having an annular recess in said passage, said annular seal entering said recess upon movement of said coupler into said valve to releasably connect said coupler and valve.

18. In a combination as in claim 16, said coupler and valve including bayonette connection means for releasably connecting the same.

19. In a combination as in claim 18, said coupler body having a pin extending radially therefrom, said valve body passage having a slot formed in the walls thereof for receiving said pin upon movement of said coupler into said passage, said slot having a first portion extending substantially longitudinally along said passage from said outlet to a first point and a second portion extending substantially orthogonally of said first portion from said first point to a second point, said coupler and valve being releasably connected upon movement of said pin into said second portion.

20. In a combination as in claim 14, said flow barrier being sealingly connected with said valve body by a frangible web to hermetically seal said passage inlet from said outlet, said coupler being engagable with said flow barrier with a force sufficient to break said frangible web.

21. In the combination as in claim 14, said flow barrier being sealingly connected with said valve body by an integral hinge to seal passage inlet from said outlet, said coupler being engagable with said flow barrier with a force sufficient to break said barrier and fold said barrier about said hinge.

22. In a combination as in claim 14, said coupler body having a valve seat at the end thereof normally closed by said channel seal, and including means within said coupler channel for normally urging said channel seal against said seat to close said channel, said means for moving said seal into said channel moving said seal from said seat against said urging means.

23. In a combination as in claim 22, said flow barrier being integrally and frangibly joined with said valve body within said passage and having a portion extending toward said passage outlet, said portion engaging said channel seal upon movement of said coupler into said valve passage to move said seal from said seat.

24. In a combination as in claim 22, said flow barrier being generally planar and integrally hinged with said valve body in a plane substantially perpendicular to said valve passage axis and scored along a surface toward said passage inlet, said coupler seal having a conical end portion extending from said coupler for engaging with an apex thereof said barrier opposite from said score upon movement of said coupler into said passage to break said barrier along said score and to fold said barrier about said hinge, means connected with said valve body including blocking means between said barrier and said passage inlet for engaging and arresting movement of said channel seal, whereby movement of said coupler into said valve breaks said barrier with said channel seal and moves said channel seal from said seat to establish said conduit between said passage and said channel.

* * * * *